United States Patent
Vuylsteke

(10) Patent No.: US 7,298,373 B2
(45) Date of Patent: Nov. 20, 2007

(54) METHOD AND USER INTERFACE FOR MODIFYING AT LEAST ONE OF CONTRAST AND DENSITY OF PIXELS OF A PROCESSED IMAGE

(75) Inventor: Pieter Vuylsteke, Mortsel (BE)

(73) Assignee: AGFA Healthcare, Mortsel (BE)

( * ) Notice: Subject to any disclaimer, the term of this patent is extended or adjusted under 35 U.S.C. 154(b) by 0 days.

(21) Appl. No.: 10/863,092

(22) Filed: Jun. 8, 2004

(65) Prior Publication Data
US 2004/0252133 A1 Dec. 16, 2004

Related U.S. Application Data

(60) Provisional application No. 60/484,195, filed on Jul. 1, 2003.

(30) Foreign Application Priority Data
Jun. 11, 2003 (EP) .................................. 03101692

(51) Int. Cl.
*G06T 17/00* (2006.01)
(52) U.S. Cl. ........................ 345/428; 345/3.3; 345/581; 345/594; 345/617; 345/619; 345/661; 382/274; 382/299; 715/833; 715/834

(58) Field of Classification Search ................. 345/3.3, 345/594, 617, 661; 715/813, 833, 834
See application file for complete search history.

(56) References Cited

U.S. PATENT DOCUMENTS

| | | | | |
|---|---|---|---|---|
| 5,270,806 A | * | 12/1993 | Venable et al. | 358/500 |
| 5,739,809 A | * | 4/1998 | McLaughlin et al. | 345/594 |
| 6,940,526 B2 | * | 9/2005 | Noda et al. | 345/629 |

FOREIGN PATENT DOCUMENTS

EP 0 527 525 A2 2/1993

* cited by examiner

*Primary Examiner*—Kee M. Tung
*Assistant Examiner*—Antonio A Caschera
(74) *Attorney, Agent, or Firm*—Leydig, Voit & Mayer, Ltd

(57) ABSTRACT

An image which has been subjected to image processing wherein contrast amplification and density can be specified independently is displayed on a display screen. An initial density level is specified. The contrast of pixels in the displayed image having a density substantially equal to the specified initial density is changed upon movement of an indicium in a first direction and the density of pixels in the displayed image having a density substantially equal to the specified initial density is changed upon movement of the indicium in a second direction.

18 Claims, 10 Drawing Sheets

METHOD AND USER INTERFACE FOR MODIFYING AT LEAST ONE OF CONTRAST AND DENSITY OF PIXELS OF A PROCESSED IMAGE

This application claims the benefit of U.S. Provisional Patent Application No. 60/484,195, filed Jul. 1, 2003, hereby incorporated by reference. This application also claims the benefit of European Patent Application No. 03101692.6, filed Jun. 11, 2003, which is incorporated by reference.

FIELD OF THE INVENTION

The present invention relates to a method of independently modifying at least one of contrast and density of pixels of an image subjected to processing whereby contrast amplification and density can be specified independently.

The invention further relates to a user interface for application of such a method.

BACKGROUND OF THE INVENTION

Nowadays several medical image acquisition techniques and systems exist that render a digital image representation of a medical image, e.g. a radiographic image.

One example of such a system is a computed radiography system wherein a radiation image is recorded on a temporary storage medium, more particularly a photostimulable phosphor screen. In such a system a digital image representation is obtained by scanning the screen with radiation of (a) wavelength(s) within the stimulating wavelength range of the phosphor and by detecting the light emitted by the phosphor upon stimulation.

Other examples of computed radiography systems are direct radiography systems, for example systems wherein a radiographic image is recorded in a solid-state sensor comprising a radiation sensitive layer and a layer of electronic read out circuitry.

Still another example of a computed radiography system is a system wherein a radiographic image is recorded on a conventional X-ray film and wherein that film is developed and subsequently subjected to image scanning.

Still other systems such as a tomography system may be envisaged.

The digital image representation of the medical image acquired by one of the above systems can then be used for generating a visible image on which the diagnosis can be performed. For this purpose the digital image representation is applied to a hard copy recorder or to a display device.

Commonly the digital image representation is subjected to image processing prior to hard copy recording or display.

In order to convert the digital image information optimally into a visible image on a medium on which the diagnosis is performed, a multiscale image processing method (also called multiresolution image processing method) has been developed by means of which the contrast of an image is enhanced.

According to this multiscale image processing method an image represented by an array of pixel values is processed by applying the following steps. First the original image is decomposed into a sequence of detail images at multiple scales and occasionally a residual image. Next, the pixel values of the detail images are modified by applying to these pixel values at least one nonlinear monotonically increasing odd conversion function with a gradient that gradually decreases with increasing argument values. Finally, a processed image is computed by applying a reconstruction algorithm to the residual image and the modified detail images, the reconstruction algorithm being the inverse of the above decomposition process.

The above image processing technique has been described extensively in European patent EP 527 525, the processing being referred to as MUSICA image processing (MUSICA is a registered trade name of Agfa-Gevaert N.V.).

The described method is advantageous over conventional image processing techniques such as unsharp masking etc. because it increases the visibility of subtle details in the image and because it increases the faithfulness of the image reproduction without introducing artefacts.

Prior to being applied to a hard copy recorder or to a display device the grey value image is pixelwise converted into a digital image representing density of the visible image.

The conversion of grey value pixels into density values suitable for reproduction or display comprises the selection of a relevant subrange of the grey value pixel data and the conversion of the data in this subrange according to a specific gradation function. Commonly, the gradation function is defined by means of a lookup table, which, for each grey value, stores the corresponding density value.

Preferably the relevant subrange and the gradation function to be applied are adapted to the object and to the examination type so that optimal and constant image quality can be guaranteed.

The shape of the gradation function is critical. It determines how the subintervals of the density range of the visible image are associated with subranges of grey values, in a monotonic but mostly nonlinear way.

In those intervals where the function is steep, a narrow subrange of grey values is mapped onto the available output density interval. On the other hand, in those intervals where the function has a gentle gradient, the available output density interval is shared by a wide subrange of grey values. If the gradation function has a gentle gradient in the low density half and evolves to steeper behaviour in the high density portion, then most of the grey values are mapped to low density, and the overall appearance of the result image will be bright. Reversely, if the gradation function takes off steeply, and evolves to the high density with decreasing gradient, then most of the grey values are mapped to high density, yielding a dark, greyish look.

This way, it is possible to determine how the density intervals are distributed across the range of grey values, by manipulating the shape of the gradation function. As a general rule, grey value subranges that are densely populated (i.e. peaks in the grey value histogram) should be mapped onto a wide output density interval. Reversely, intervals of grey values that occur infrequently in the image should be concentrated on narrow density intervals. This paradigm known as histogram equalization leads to enhanced differentiation of grey value regions in an image.

The density of pixels and image regions is determined by the corresponding ordinate value of the gradation function. The contrast amplification of pixels and image regions on the other hand, is determined by the corresponding derivative value (i.e. the gradient) of the gradation function. As a consequence, if the shape of the gradation function is adjusted to accommodate a large subrange of grey values within a specified density interval, i.e. if the interval has to cope with wide latitude, then at the same time the contrast in that density interval will drop. On the other hand, if a density interval is assigned to only a narrow grey value subrange, then that interval will provide enhanced contrast.

If requirements with respect to density and contrast amplification are conflicting, which is often the case, then a compromise is unavoidable.

In one embodiment of the multiscale image processing method as described in the above-mentioned European patent EP 527 525, the gradation function is applied after the reconstruction process, which is the inverse of the multiscale decomposition. The gradation function is applied to the final scale of reconstruction. As a consequence, the contrast-to-grey value relationship, which is specified by the derivative of the gradation function, is identical at all scales.

In some cases however, it is favourable to differentiate contrast adjustment depending on grey value and scale simultaneously. E.g. in chest images it is important to have high contrast in the smaller scales (i.e. small scale contrast) at high grey values to enhance conspicuity of pneumothorax, but only moderate small scale contrast in the low grey value areas like the mediastum. At the same time, large-scale contrast in the lower and mid grey values must be appropriate to visualise e.g. pleural masses.

In some embodiments disclosed in the above-mentioned European patent application EP 527 525 scale-dependent boosting or suppression of the contribution of detail information is applied.

Two different implementations have been described.

In a first implementation the modified detail images are pixelwise multiplied by a coefficient in the last stages of the reconstruction process. The value of such a coefficient depends on the brightness of the pixels of the partially reconstructed image.

In a second implementation a partially reconstructed image is converted according to a monotonically increasing conversion function with gradually decreasing slope, for example a power function. Then the reconstruction process is continued until a full size reconstructed image is obtained. Finally the resulting image is converted according to a curve that is the inverse of the afore-mentioned conversion curve.

Although this disclosure describes scale-dependent suppression or boosting of the contribution of detail information, it does not describe the way in which an envisaged density nor contrast amplification as a function of grey value can be obtained.

It is an aspect of the present invention to provide a method of modifying at least one of contrast and density of pixels of a processed image.

It is another aspect of the present invention to provide a user interface for such methods.

Further aspects will become apparent from the description given below.

SUMMARY OF THE INVENTION

The above mentioned aspects are realised by a method of modifying at least one of contrast and density of pixels of a processed image as set out in claim 1.

In accordance with the present invention density and contrast in an image are modified independently. In the context of this invention the term 'independently' relates to processing methods in which modification of contrast does not have substantial influence on the density levels in the image and wherein modification of the density does not substantially influence the contrast in the image. Examples of such processing will be elaborated further on.

In the context of the present invention the term indicium refers to a marker, cursor, arrow or the like by means of which a movement with two degrees of freedom can be executed. This movement will be used to control the change of density or contrast of selected pixels in the displayed image without these changes having a mutual influence.

In one embodiment of the present invention an initial density level is specified by selecting a pixel or pixel region in the displayed image that has the envisaged initial density. According to the invention pixels in the image are modified that have a density value that is equal to or close to that initial density. This embodiment is advantageous in that the user can easily identify the density which is to be modified or of which the corresponding contrast is to be modified.

Preferably the amount by which contrast or density is changed is largest for pixels that have a density equal to the specified initial density. The amount by which contrast or density is changed preferably gradually decreases for selected pixels that have a density which is lower or higher than the initial density.

Another embodiment of this invention relates to a method of modifying at least one of contrast and density of the pixels of a processed image wherein the processed image and at least one of a density axis and contrast amplification axis of a coordinate system, a density histogram of said processed image, a contrast amplification curve that represents contrast amplification as a function of density applied to obtain said processed image and a movable indicium on said contrast amplification curve in a position corresponding with an initial density and contrast, are displayed on a screen.

The indicium is moved in at least one of the directions of said axes. Upon movement of the indicium in the direction of the contrast amplification axis contrast of selected pixels that have a density value that is substantially equal to said initial density in the displayed image is changed. Upon movement of the indicium in the direction of the density axis, density of selected pixels that have a density value that is substantially equal to said initial density in the image is changed. This way, contrast and density are changed independently. Movement of the indicium is not restricted to a direction along one of the axes. Any arbitrary two-dimensional movement in the plane causes a simultaneous change of contrast and density, in accordance with the magnitudes of movement components along both axes.

This embodiment can also be combined with the embodiment of claim 1.

In this embodiment an initial density level can likewise be specified by selecting a pixel or pixel region in the displayed image that has the envisaged initial density. Pixels are modified that have a density value that is equal to or close to that initial density. This embodiment is advantageous in that the user can easily identify the density which is to be modified or of which the corresponding contrast is to be modified.

In still another embodiment an initial density can be chosen by selecting a working point in the displayed coordinate system. Modifications can be controlled by moving the working point in the direction of either density or contrast amplification axis, or in a direction that involves simultaneous adjustment of contrast and density Preferably the amount by which contrast or density is changed is largest for pixels that have a density equal to the initial density. The amount by which contrast or density is changed preferably gradually decreases for selected pixels that have a density which is lower or higher than the initial density.

In each embodiment the width of the range of density values that are regarded as substantially equal to the initial density may be set by the operator and is dependent on the application.

It is furthermore advantageous that the density histogram and/or contrast amplification curve pertaining to the image obtained as result of the movement of the indicium is displayed. To this end the original histogram and contrast amplification curve may be adapted during the modification process.

The above methods are applicable to images that have been subjected to multiscale gradation processing as is described further on in this text. However, the method is also applicable to other implementations of contrast rendition whereby contrast amplification and density can be specified independently.

Another aspect of the present invention relates to a user interface for an image processing and display unit.

The user interface comprises a window wherein a processed image is displayed, means such as a pointer or cursor operated by an interactive control device such as a mouse, for specifying an initial density level, a first indicium movable in at least one of two directions, whereby movement of said first indicium in a first direction causes a change of density of pixels that have a density value that is substantially equal to said initial density and whereby movement of said first indicium in a second direction causes a change of contrast of pixels that have a density value that is substantially equal to said initial density, whereby contrast and density are changed independently.

In one embodiment the means for specifying an initial density is a second indicium which is displayed on the screen and which is movable across the displayed image. The initial density can be specified by moving this indicium past the image to a pixel or a pixel region having that specific density and by selecting the density value of a pixel covered by the indicium.

In another embodiment the means for specifying an initial density is the same as the first indicium. In this implementation an initial density can for example be selected by indicating with a pointer a pixel having that initial density followed by entering this value. Next the same pointer can be moved in a first and a second direction thereby independently changing the density or contrast of pixels having a density substantially equal to that initial density.

The width of the range of density values that are regarded as substantially equal to the initial density may be set by the operator and is dependent on the application.

In still another embodiment additional items are displayed, e.g. in an additional window. In this additional window at least one of the following is displayed: a density axis and a contrast amplification axis of a coordinate system, a density histogram of a processed image, a contrast amplification curve that represents contrast amplification as a function of density applied to obtain said processed image and a third indicium on said contrast amplification curve in a position corresponding with the initial density and contrast of said processed image, a density wedge along the density axis.

In this embodiment preferably at least one of the histogram, the contrast amplification curve and the position of the third indicium is adapted in correspondence with the movement of said second indicium.

Alternatively, the position of said third indicium may be changed and at least one of the histogram, the contrast amplification curve and the processed image is changed upon movement of the third indicium.

The embodiments of the methods of the present invention are generally implemented in the form of a computer program product adapted to carry out the method steps of the present invention when run on a computer. The computer program product is commonly stored in a computer readable carrier medium such as a CD-ROM. Alternatively the computer program product takes the form of an electric signal and can be communicated to a user through electronic communication.

The methods in accordance with the present invention are applicable to any kind of monochrome digital images. They are also suited for independently adjusting the density and contrast of colour images. To this end, the colour images comprising three components for each pixel, commonly representing the red, green and blue channel inputs of video equipment (RGB), are preferably converted into a standard colour space that represents hue, saturation and luminance (HSL). If an image is represented in this colour space, then the methods in accordance with the present invention are preferably applied to the luminance component only, as if it were a monochrome image. If only this channel is affected, then the contrast and density can be adjusted without introducing colour distortions.

The method and user interface of the present invention is suited for displaying any kind of monochrome and color images obtained from a wide variety of acquisition devices in a wide variety of fields of applications wherein interactive modifications of density and/or contrast can be performed.

Examples of other applications than medical imaging in which the method and user interface can be applied are the following: modification of images obtained by scanning systems and digital cameras in the field of photofinishing, in aerial photography, prepress, application to video images e.g. for image restoration, digital film paste up on computer etc. The invention is not limited to the enumerated acquisition methods and enumerated fields of application.

In the method and user interface of the present invention contrast and density are changed independently. This can be obtained with processing methods wherein contrast and density are specified independently. Examples of multiscale gradation processing methods wherein contrast and density are specified independently are described below with reference to the following drawings.

DETAILED DESCRIPTION OF THE INVENTION

Description of an Image Acquisition System

Figure 1:
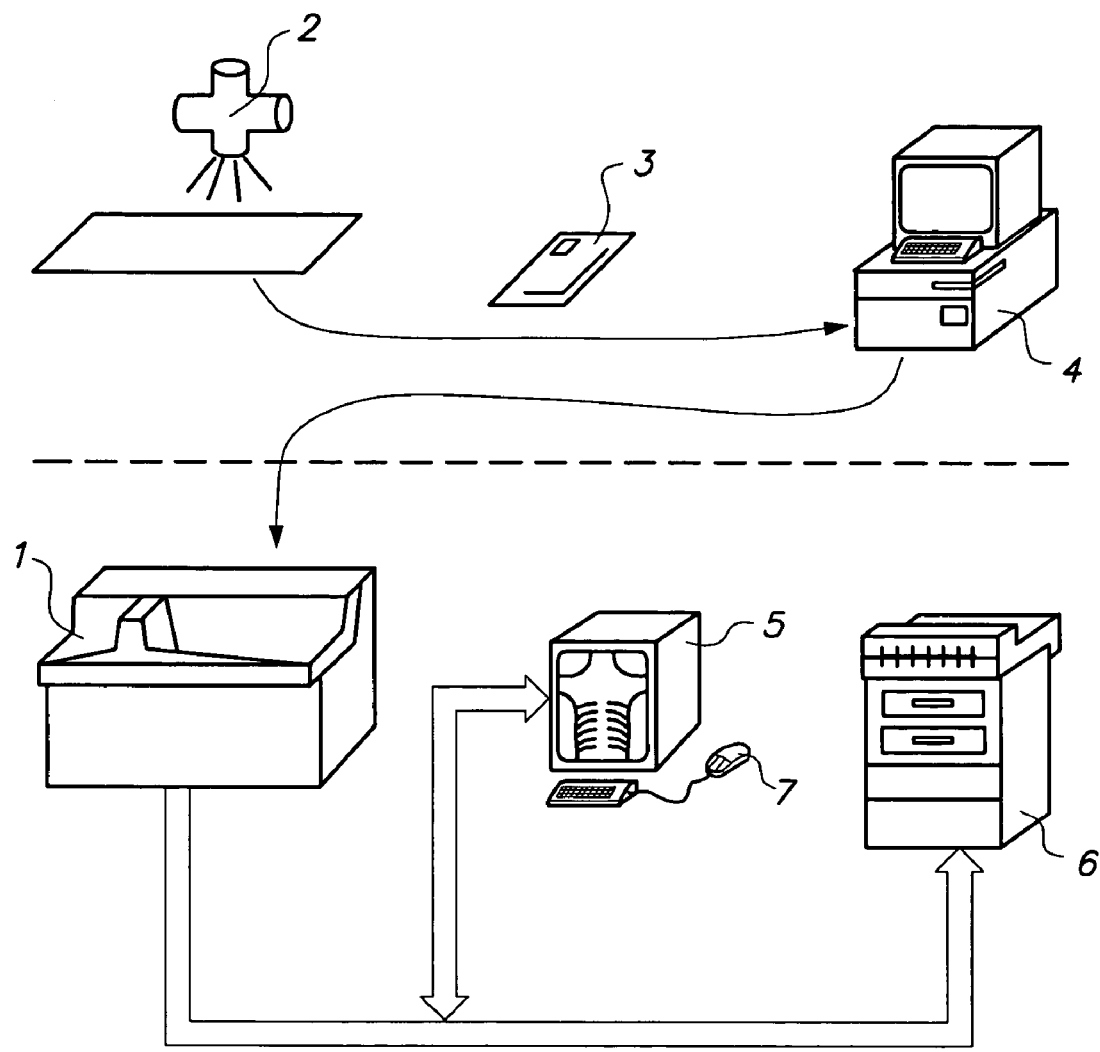
FIG. 1 shows an apparatus for acquisition of a digital image representation of a medical image, for processing the digital image and for generating an enhanced visible image.

X-rays emitted by a source of radiation (2) are transmitted by a patient (not shown) and recorded on a temporary storage medium, more particularly a photostimulable phosphor screen (3). In an identification station (4) patient identification data are written into a memory device, e.g. an EEPROM provided on a cassette carrying the photostimulable phosphor screen.

The exposed photostimulable phosphor screen is then fed into a read out apparatus (1) where a digital image representation of the stored radiation image is generated.

For this purpose the exposed screen is scanned by means of radiation having (a) wavelength(s) within the stimulation wavelength range of the photostimulable phosphor.

Image-wise modulated light is emitted by the phosphor upon stimulation. This light is detected and converted by an opto-electronic converter and subsequent A-to-D converter into a digital image representation of the radiation image.

The digital image representation is applied to an image-processing station (5) to which is connected an interactive control device such as a mouse (7) and which can be incorporated in the read out device or provided as a separate workstation. In the image-processing station the digital image representation is subjected to different kinds of processing, among which are multiscale contrast enhancement, noise reduction and gradation processing. The modification method of the present invention is also performed on this processing station.

The processed digital image can also be applied to an output apparatus such as a hard copy recording device (6) where a visible image is generated. The visible image can be used by the radiologist for making a diagnosis.

Image Chain

By means of the terms 'image chain' is meant the sequence of image operations and image processing control mechanisms that are applied either separately or in combination to the digital image representation for transforming the signal generated by the read out device into a processed digital image representation that can be applied to the output device.

Figure 2:
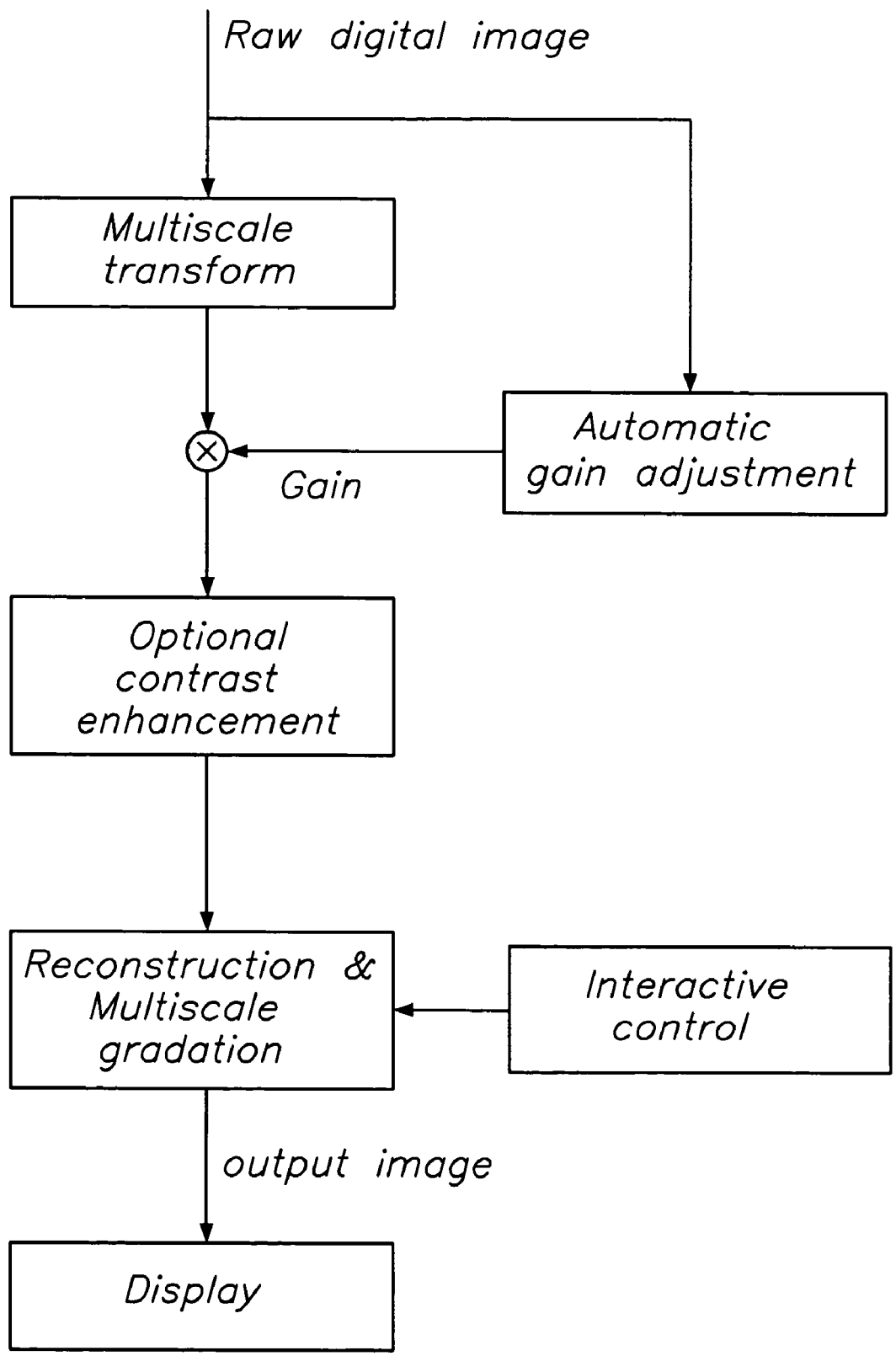
FIG. 2 is a block scheme illustrating the image chain.

A block diagram illustrating the entire image chain is illustrated in FIG. 2.

The image chain comprises the steps enumerated below.

In a preliminary step the digital signal representation of an image is subjected to a conversion according to a square root function, in order to make the pixel values proportional to the square root of the radiation dose recorded on the photostimulable phosphor screen. The resulting image is called a raw digital image.

One of the main sources of noise in the image is quantum mottle, which has a Poisson distribution. The square root conversion ensures that the noise statistics is transformed into a Gaussian distribution, with a standard deviation that is independent of dose. The latter preprocessing of the digital image is not essential, but it greatly simplifies the mathematics of the subsequent processing stages, because the noise can then be assumed roughly uniform across the raw image.

In an alternative embodiment, the square root conversion is carried out in the read out apparatus by means of an amplifier with square root characteristic. A raw digital image is generated by applying A-to-D conversion to the resulting signal.

In still other embodiments, the digital signal representation of an image is converted according to a logarithmic function, or according to a linear function.

With all embodiments, the raw digital image is used for further processing.

In a first processing step the raw digital image is decomposed into at least two detail images at successive scales and occasionally a residual image (further referred to as multiscale representation), according to a multiscale transform. The components of the multiscale representation are referred to as detail images. The pixel values of the multiscale representation correspond with the contrast of elementary image components, relative to their close neighbourhood.

In the next step the multiscale representation may be subjected to an automatic gain adjustment procedure to cancel out disturbing fluctuations that are due to dose variations, different exposure parameters, different patient latitude etc, optionally followed by one or more of steps of reducing excess contrast and enhancing subtle contrast or edge contrast, as set forth in EP 02102368 filed Sep. 18, 2002

Next the processed multiscale representation is subjected to a reconstruction step by applying the inverse of the decomposition transform to the modified detail images.

In the course of reconstruction, a series of scale-specific conversion functions are consecutively applied to the partially reconstructed image, in order to adjust contrast amplification as a function of both grey value and scale. The latter process will be referred to as multiscale gradation. The thus obtained pixel values are the driving values for the hard- or softcopy reproducing device, further on referred to as density values.

1. Multiscale Transform

The raw digital image is subjected to a multiscale decomposition. The image is decomposed into at least two detail images representing detail at several successive scales.

This technique has been described extensively in EP 527 525.

The pixels of the detail images represent the amount of variation of pixel values of the original image at the scale of the detail image, whereby scale refers to spatial extent of these variations.

A residual image can also be generated which is an approximation of the original image with omission of all variations comprised in the detail images.

The detail images at subsequent scales (or resolution levels) are called multiscale layers, or simply layers.

Figure 3:
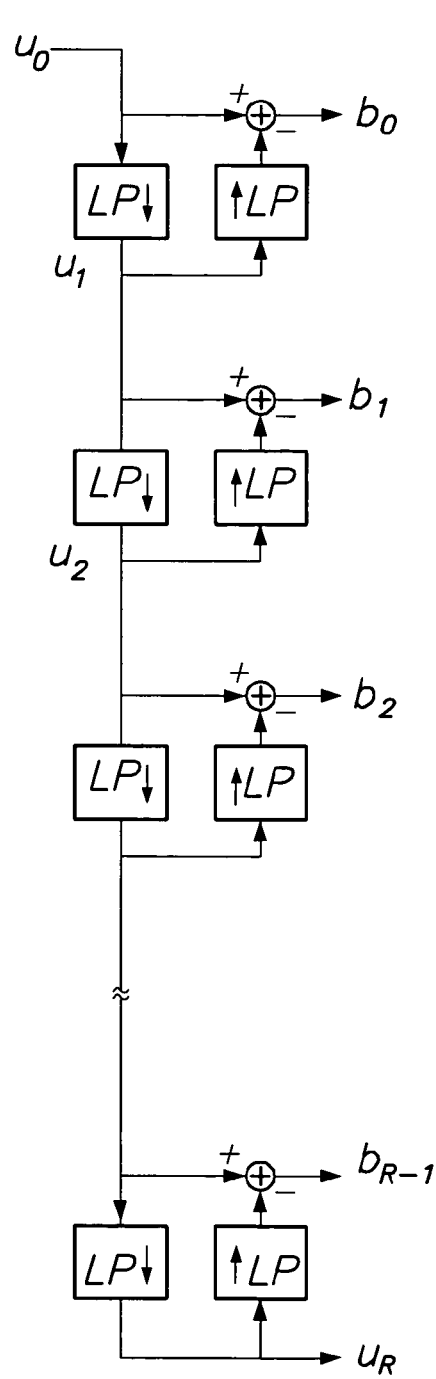
FIG. 3 illustrates a first embodiment of performing the multiscale decomposition step, according to the Burt pyramid transform.

In a first embodiment of computing a multiscale transform the detail images at successively larger scales are obtained as the result of each of R iterations of the following steps, as depicted in FIG. 3:

a) computing an approximation image $g_{k+1}$ at a next larger scale k+1 by applying a low pass filter LP to the approximation image $g_k$ corresponding to the current iteration k, and subsampling the result in proportion to the reduction in spatial frequency bandwidth, using however the original image $u_0$ as input to said low pass filter in the course of the first iteration;

b) computing a detail image $b_k$ as the pixelwise difference between the approximation image $u_k$ corresponding to the current iteration and the approximation image $u_{k+1}$ at a next larger scale computed according the method sub (a), both images being brought into register by proper interpolation (represented by [↑ LP] in the flow chart) of the latter image; wherein the residual image $u_R$ is equal to the approximation image produced by the last iteration.

Figure 4:
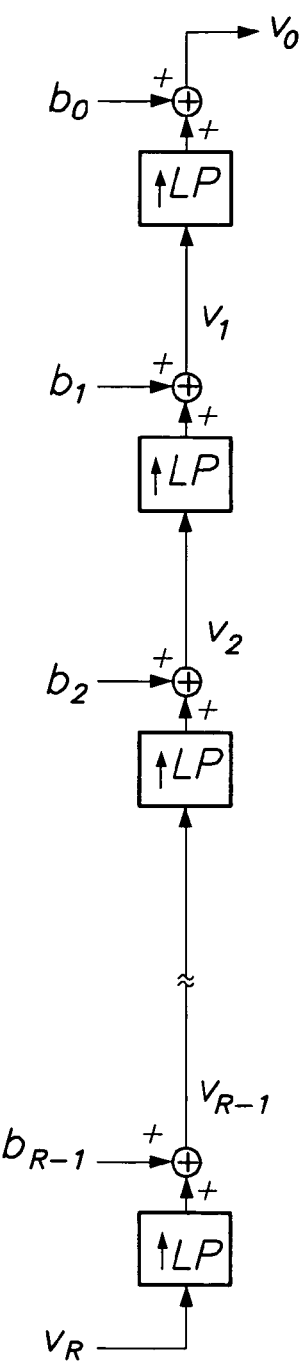
FIG. 4 illustrates the corresponding reconstruction step.

The corresponding reconstruction (which we will refer to as ordinary reconstruction, i.e. reconstruction without multiscale gradation) is done by applying the inverse transform, as depicted in FIG. 4. In the described embodiment ordinary reconstruction is implemented by iterating R times the following procedure starting from the largest scale detail image $b_{R-1}$ and the residual image $v_R = u_R$: computing the approximation image $v_k$ at the current scale k by pixelwise adding the detail image $b_k$ at the same scale to the approximation image $v_{k+1}$ at the larger scale corresponding to the previous iteration, both images being brought into register by proper interpolation of the latter image, using however the residual image $v_R$ instead of said larger scale approximation image in the course of the first iteration.

The residual image will be a low-resolution image or in the extreme case, an image comprising only one single pixel, depending on the number of iterations in the decomposition.

The latter combination of forward and inverse multiscale transform is commonly known as the Burt pyramid transform.

In an alternative embodiment the image is decomposed into a weighted sum of predetermined basic detail images at multiple scales and occasionally a residual basic image by applying a transform to the image, the transform yielding a set of detail coefficients each expressing the relative contribution to the original image of one of a set of basis functions representing these basic detail images and occasionally a residual coefficient representing the relative contribution to the original image of a basis function representing the basic residual image.

The basis functions are continuous and non-periodic and have zero mean value except for the basis function that represents the basic residual image. An example of such basis functions are wavelets.

The transform is such that there exists an inverse transform which returns the original image or a close approximation thereof when being applied to the transform coefficients.

The image can be reconstructed by applying the inverse transform to the detail coefficients and the residual coefficient if generated.

Figure 6:
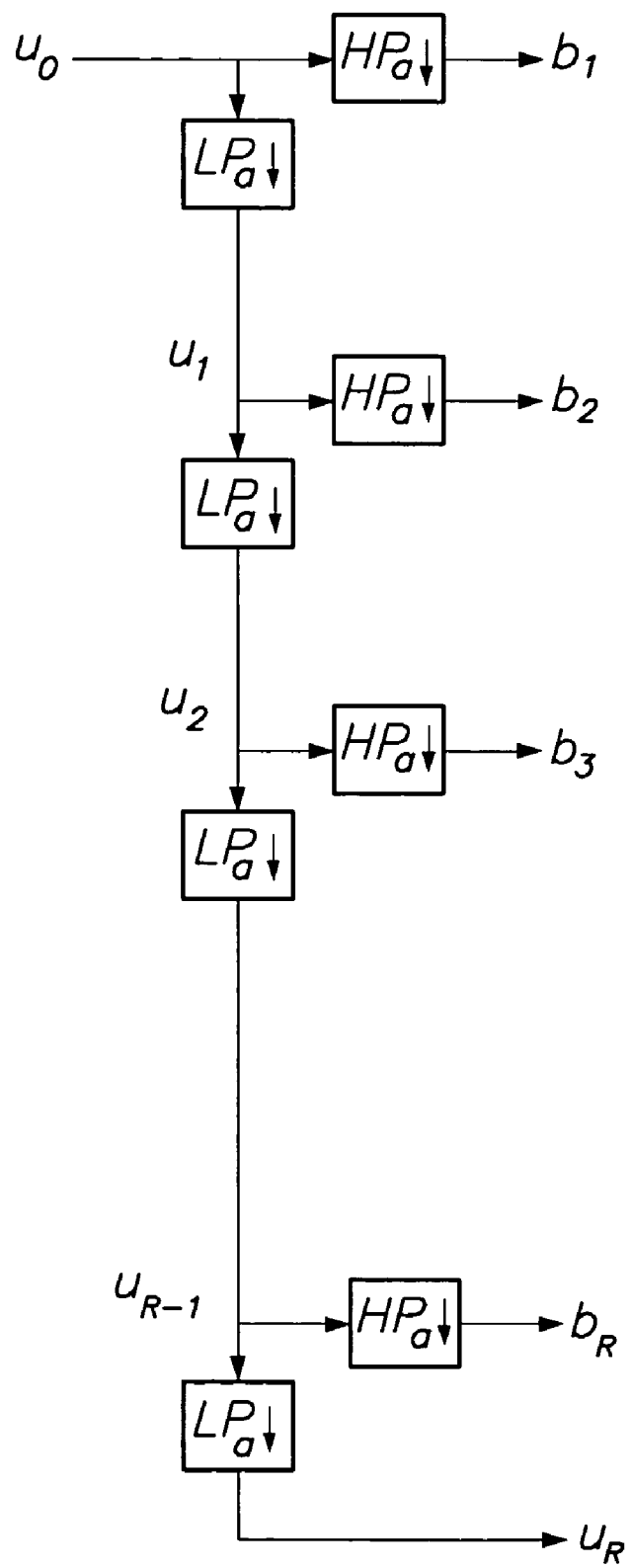
FIG. 6 illustrates a second embodiment of performing the multiscale decomposition step, according to a dyadic wavelet transform.
Figure 7:
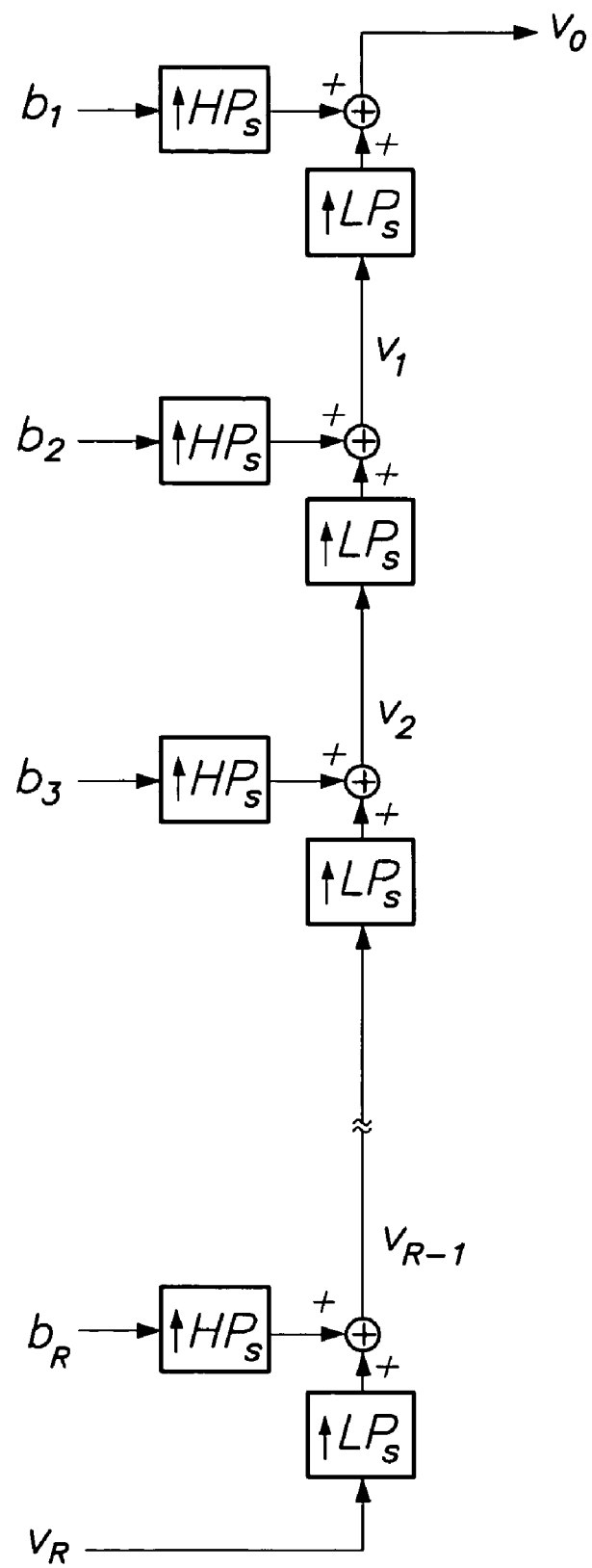
FIG. 7 illustrates the corresponding reconstruction step.

An example of the alternative embodiment is depicted in FIGS. 6 and 7, where FIG. 6 shows a forward dyadic wavelet transform and FIG. 7 the corresponding inverse transform.

In the forward transform, shown in FIG. 6, the original image $u_0$ is split into a larger-scale approximation image $u_1$ and a detail coefficient image $b_1$ by applying a low-pass analysis filter $LP_a$ and high-pass analysis filter $HP_a$, respectively, followed by subsampling of both images. This splitting process is repeated R times based on the current approximation image, each time yielding an additional detail coefficient image and an approximation image at the next larger scale.

The flow chart of the corresponding inverse transform is shown in FIG. 7. Starting from the residual image $v_R = u_R$, which is an approximation image at the largest scale, an approximation image $v_{R-1}$ at the next smaller scale is computed by upsampling and low-pass filtering the current approximation image $v_R$, up-sampling and high-pass filtering the detail coefficient image $b_R$, and pixelwise summing the latter results. Subsequent smaller scale approximation images are obtained by iterating this process R times based on the current approximation image $v_k$ and the corresponding detail coefficient image $b_k$.

In a preferred embodiment the high pass filters are directional, e.g. representing grey value transitions in a specific direction. In that case, the detail coefficients $b_k$ at each scale are partitioned into coefficients $bh_k$, $bv_k$, $bd_k$, representing either horizontal, vertical and diagonal detail at that scale. Each of the blocks $HP_a$ then represents a bank of 3 filters, one for each direction.

2. Reconstruction and Multiscale Gradation

When the (optional) procedures for contrast enhancement shown s in FIG. 2 have been performed as described in EP 02102368 filed Sep. 18, 2002, the image is reconstructed by applying to the modified detail images the image transform that is the inverse of the multiscale decomposition.

Details on the ordinary reconstruction procedure are described higher in the paragraph relating to image decomposition.

In a first embodiment in accordance with this invention, multiscale gradation is implemented by inserting a series of scale-specific conversion functions in the reconstruction process. At each stage in the reconstruction process where a conversion function is inserted, the latter is applied to the approximation image at a scale corresponding to the current iteration, and the result of conversion is used as the input image of the next iteration, as described below.

Figure 5:
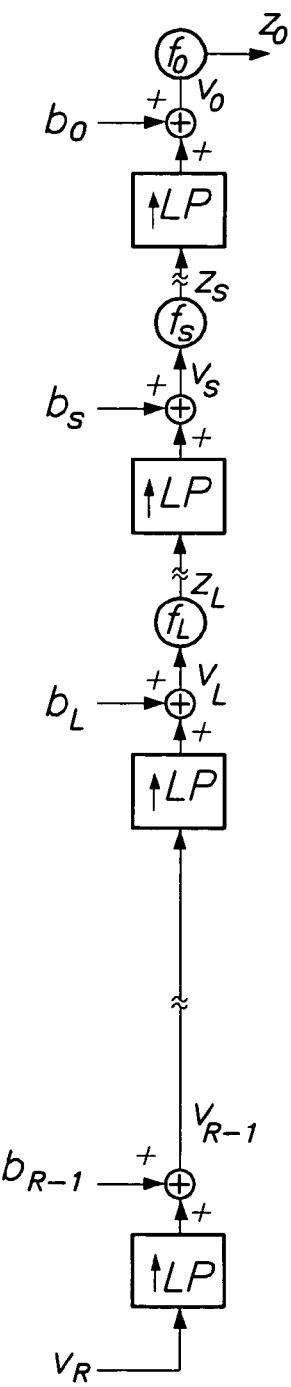
FIG. 5 shows an embodiment of multiscale gradation according to a first multiscale transform embodiment.

Referring to FIG. 5 which shows a multiscale gradation embodiment according to the Burt pyramid transform, the normal inverse transform is modified as follows.

From the iteration that corresponds with the scale k=L until the smallest scale k=0, the computed approximation image $v_k$ is pixelwise converted by a scale-specific conversion function $f_k(\ )$ before it is passed to the next iteration.

Figure 8:
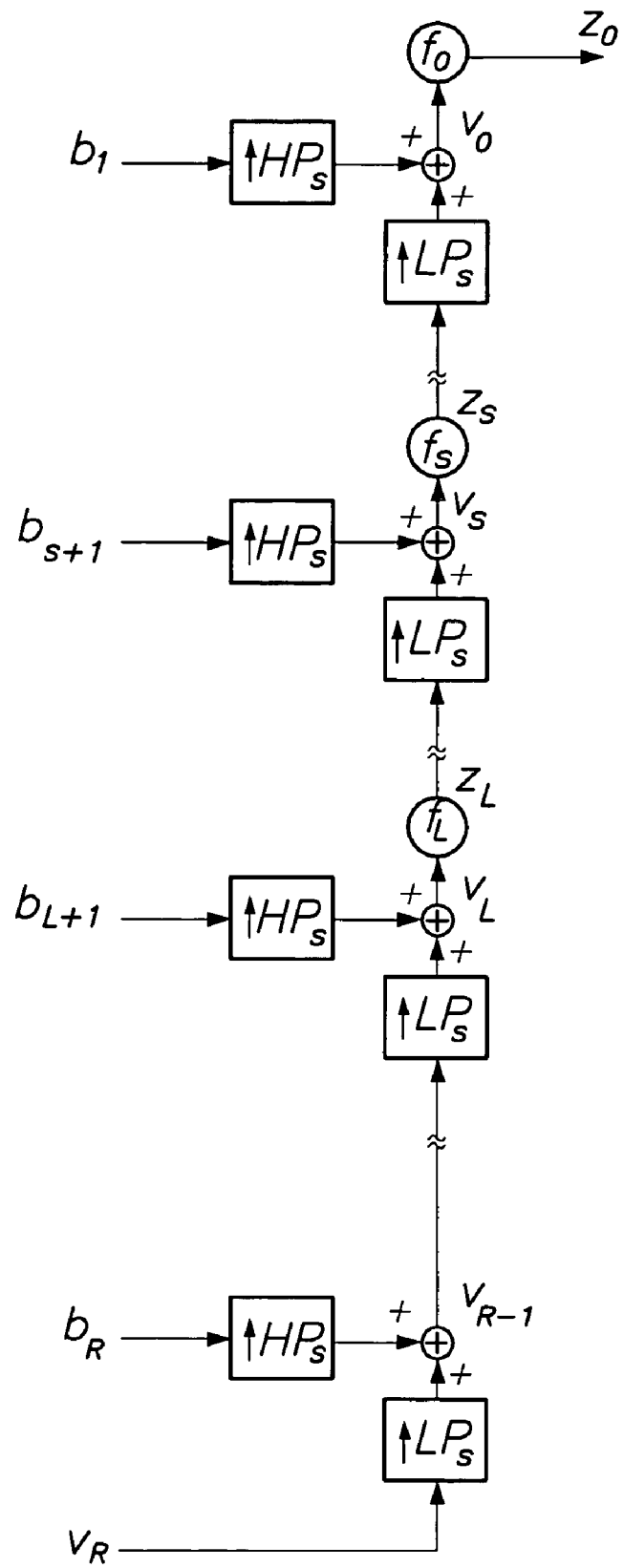
FIG. 8 shows an embodiment of multiscale gradation according to the second multiscale transform embodiment

As to the second multiscale transform embodiment described sub 1, i.e. dyadic wavelet transform, the modification for implementing multiscale gradation is very similar. Referring to FIG. 8, from the iteration that corresponds with the scale k=L until the smallest scale k=0, the computed approximation image $v_k$ is pixelwise converted by a scale-specific conversion function $f_k(\ )$ before it is passed to the next iteration.

By an appropriate choice of the series of conversion functions $f_k(\ )$ it is possible to specify the contrast amplification as a function of grey value and scale, and to specify grey value-to-density mapping independently from contrast amplification.

To this end, the scale-specific conversion functions $f_k(\ )$ are determined as will be described below, starting from a series of functions $gm_k(\ )$, referred to as scale-specific gradient functions. For a specific scale k, the corresponding scale-specific gradient function $gm_k(\ )$ specifies the amount of contrast amplification at that scale. Equivalently, the scale-specific gradient function at scale k specifies how much a small pixel value difference (i.e. scale-specific contrast) at that scale is amplified by the combined effect of all concatenated conversion functions $f_k(\ )$ up to the smallest scale k=0.

Also, the scale-specific gradient function $gm_k(\ )$ specifies to which extent the finally reconstructed image $z_0$ is sensitive to a unit detail arising from a pixel with unit value in the corresponding detail image, i.e. $b_k$ in case of the Burt pyramid transform, or $b_{k+1}$ in case of the dyadic wavelet transform.

The scale-specific gradient functions are equivalent to the partial derivative functions:

$$gm_k(t) = \frac{\partial z_0}{\partial z_{k+1}}, k = 0, 1, \ldots, L$$

in which $z_k$ represents the image that results from pixelwise applying the conversion function $f_k(\ )$ to the approximation image $v_k$, and $t=v_L$, i.e. the pixel value of the partially reconstructed image at scale L, which is the largest scale involved in multiscale gradation. In the present context, the pixel values t are referred to as the large-scale average grey values.

Relying on the concatenation rule for derivation, the scale-specific gradient functions can be written as:

$$gm_k(t) = f_0'(F_1(t)) \cdot f_1'(F_2(t)) \cdot \ldots \cdot f_k'(t),$$

in which $f_k'(t)$ represent the derivative functions of the scale-specific conversion functions.

The cumulative conversion functions at subsequent scales are the concatenation of scale-specific conversion functions $f_k(\ )$ from the largest scale L involved in multiscale gradation, up to the scale considered:

$$F_k(t) = f_k \circ f_{k+1} \circ \ldots \circ f_L(t),$$

in which the operator $\circ$ stands for function concatenation.

The derivative of a cumulative conversion function with respect to t is equal to:

$$F_k'(t) = f_k'(F_{k+1}(t)) \cdot f_{k+1}'(F_{k+2}(t)) \cdot \ldots \cdot f_L'(t),$$

or equivalently, the derivatives of cumulative conversion functions can be expressed in terms of scale-specific gradient functions:

$$F_0'(t) = gm_L(t)$$

$$F_k'(t) = \frac{gm_L(t)}{gm_{k-1}(t)} \quad k = 1, 2, \ldots, L$$

The cumulative conversion functions are then obtained by integration:

$$F_0(t) = \int_{t_0}^{t} gm_L(x) \cdot dx$$

$$F_k(t) = \int_{t_0}^{t} \frac{gm_L(x)}{gm_{k-1}(x)} \cdot dx \quad k = 1, 2, \ldots, L,$$

where $t_0$ is the abscissa t at which $F_k(t)=0$. This parameter determines the offset of the cumulative conversion functions. For convenience, it may be set to 0; then all cumulative conversion functions will cross the origin of the coordinate system.

The scale-specific conversion functions $f_k(\ )$ are finally obtained by inversion of the cumulative conversion functions $F_k(t)$:

$$f_k(\ ) = F_k \circ F_{k+1}^{-1}(\ ), k=0, 1, \ldots, L-1$$

$$f_L(\ ) = F_L(\ )$$

In a preferred embodiment, function inversion is avoided by storing all functions in tabular form (i.e. as lookup tables).

First, the tables of scale-specific gradient functions $gm_k(\ )$ are computed in a way that will be described below.

Next, the cumulative conversion functions $F_k(t)$ are computed by conventional numerical integration techniques such as the trapezoidal rule, and also stored in tabular form as N equidistant points $(t_i, F_k(t_i))$, $i=0, 1, \ldots, N-1$.

Finally, from these tables, the scale-specific conversion functions $f_k(\ )$ are easily derived, also in tabular form. The N (abscissa, ordinate) pairs that define the function $f_k(\ )$ are given by $(F_{k+1}(t_i), F_k(t_i))$, for the scales $k=0, 1, \ldots, L-1$. At scale L which is the largest scale considered in the multiscale gradation process, the function $f_L(\ )$ is identical to $F_L(\ )$. Hence in tabular form the latter is specified by $(t_i, F_L(t_i))$.

This way, all scale-specific conversion functions are defined by series of points, which in general, are non-equidistant. Therefore, the functions $f_k(\ )$ have to be interpolated in order to be evaluated at arbitrary integer input values.

3. Independent Adjustment of Density and Contrast

In accordance with the process described above, the behaviour of multiscale gradation is entirely determined by the shapes of the gradient functions $gm_k(\ )$ at subsequent scales. Small-scale, medium-scale and large-scale contrast are controlled by specifying appropriate scale-specific gradient functions, as described below. In accordance with the present invention the gradient functions $gm_k(\ )$ have an initial specification $gm0_k(\ )$ which is either fixed or depends on the grey value histogram and which determine the initial density and contrast rendering of the image before any adjustment of density or contrast according to the present invention is carried out. Typically, the resulting image is the one that is shown on the display monitor of a workstation at the beginning of an interactive adjustment session. With each new adjustment of density or contrast amplification a new series of multiscale gradient functions is defined which are denoted by $gm_k(\ )$, and which specify the density and contrast rendering of the image at the current stage of adjustment. Typically one or more subsequent adjustments of density and contrast may be required to render an image with optimal density and contrast.

In a preferred embodiment the initial gradient functions are defined as follows.

3a. Initial Large-scale Gradient Function

The initial large-scale gradient function $gm0_L(t)$ specifies the contrast amplification at a large scale L, which is the largest scale involved in multiscale gradation. In the absence of smaller scale detail, i.e. if all detail pixels $b_k$ (or $b_{k+1}$ in case of dyadic wavelet transform) are equal to zero at scales $k=0, 1, \ldots, L-1$, then it also determines how the grey values t of the large-scale approximation image $v_L$ are mapped onto the density scale y of the visible image. The integral of the large-scale gradient function is then equivalent to an ordinary gradation function $y_L(t)$ to be applied to the large-scale grey value image $v_L$. In the normal case, i.e. when detail at smaller scale is actually present, then the integral of the function $gm0_L(t)$ still determines the large-scale average density distribution of the visible image, which is further modulated by smaller-scale details.

In a preferred embodiment, the large-scale gradient function $gm0_L(\ )$ is obtained as the derivative of what will be referred to as the initial large-scale gradation function $y0_L(t)$.

$$gm0_L(t) = \frac{d}{dt} y0_L(t)$$

The initial large-scale gradation function is determined as described below.

First, a series of anchor points $t_k$ is determined from the grey value histogram his(t) of the large-scale grey image $v_L$. Each anchor point corresponds with a predefined percentile $p_k$ of the histogram, i.e. $t_k$ are the grey values at which the cumulative histogram is equal to $p_k$.

Preferably, the number of anchor points nk is quite small, e.g. nk=5, and $p_k$=0%, 15%, 50%, 85%, 100%, for k=0 . . . 4.

The large-scale gradation function is specified by its predefined ordinate values in the anchor points:

$$y0_L(t_k) = y_k$$

Preferred ordinate values are $y_k$=3%, 10%, 50%, 90%, 97%, expressed as a percentage of the output range.

The optimal number and position of the anchor points, and the corresponding ordinate values may vary depending on the kind of images. In the special case where $p_k = y_k$ for all anchor points, the gradation function is identical to the gradation function obtained by global histogram equalisation.

The gradation function is defined by fitting a piecewise polynomial function such as a spline or a Bezier curve to the predefined anchor points. It is extrapolated beyond the range $[t_0, t_{nk-1}]$ by linear extension segments having predefined slopes $g_0$ and $g_{nk-1}$ respectively.

In an alternative embodiment, the grey value histogram is restricted to a subset of image pixels indicated by a binary image mask, that are judged to belong to a relevant image regions based on criteria such as local contrast to noise ratio, by a method such as described in EP 02102368 filed Sep. 18, 2002.

3b. Initial Small-scale Gradient Function

At the smaller scales, the so-called initial small-scale gradient function $gm0_S(t)$ has a predefined shape. The value of this function specifies to which amount the contrast of fine details will be amplified as a function of grey value. Hence, by explicitly defining the shape of this function, it is possible to enforce specific small scale contrast behaviour across the range of grey values. The initial small-scale gradient function $gm0_k(t)$ is the same for all smaller scales ranging from k=0 through a predefined scale k=S.

As a general rule, the function should have a nominal value in the central part of the relevant grey value subrange $[t_0, t_{nk-1}]$, and fall off towards the peripheral parts of the subrange. This empirical rule ensures that the contrast is high in the most relevant grey value subrange and gradually vanishes in lowermost and uppermost subranges, in accordance with the 'foot' and 'shoulder' behaviour of common gradation curves in digital systems [such as disclosed in copending European patent application EP 02100181.3], but also in screen-film systems, known as the H&D curves.

In the special case where the initial small-scale gradient function is chosen identical to the initial large-scale gradient function, and the further described intermediate-scale gradient functions are also identical, then the contrast behaviour is the same as if the initial large-scale gradation function $y0_L(t)$) is applied immediately to the final reconstruction result, i.e. if only a single gradation function is applied in the conventional way.

In accordance with the method of the present invention, it is possible to differentiate the contrast behaviour, which is mostly related to the smaller and intermediate scales, from the density mapping behaviour which is essentially related to the larger scales, by choosing a small-scale gradient function that actually differs from the large-scale gradient function. E.g. by specifying the initial small-scale gradient function basically identical to the initial large-scale gradient function, except in the lower part of the relevant pixel subrange, where it is made higher, the contrast in the lower densities will increase without affecting the contrast in the high densities. This setting is favourable for enhancing the contrast of trabecular bone structure. Alternatively, the contrast at the skin boundaries can be raised by specifying the small-scale gradient function having high value in the darkmost part of the relevant grey value subrange. Such adjustment is recommended for better visualizing soft tissue lesions near the skin boundary. By specifying a small-scale gradient function that exceeds the large-scale gradient function everywhere, overall contrast is reinforced without significantly altering the global distribution of densities (which is determined by the large-scale gradient function).

In a preferred embodiment the small-scale gradient function is specified to have a predefined shape independent from the large-scale gradient function. This is achieved by specifying predefined function values in the anchor points.

This way, the range of density levels may be matched to the actual grey value range of the image according to predefined histogram percentiles by the method described above, without affecting however the contrast, which depends on an independently specified small-scale gradient function.

In an alternative embodiment the initial small-scale gradient function is predefined by its ordinate values $gm0_S(t_k)= c_k$ in the nk anchor points, expressed as a predefined percentage of the average initial large-scale gradient $$gm0_{Lav} = \frac{y0_L(t_{nk-1}) - y0_L(t_0)}{t_{nk-1} - t_0}$$

Initial small-scale gradient values are preferably in the range between 10% and 400% of $gm0_{Lav}$, most preferably $c_k$=100%, 170%, 250%, 100%, 25%.

The small-scale gradient function is defined by fitting a piecewise polynomial function such as a spline or a Bezier curve to the predefined anchor points. It is extrapolated beyond the range $[t_0, t_{nk-1}]$ by constant extension segments having ordinate values $c_0$ and $c_{nk-1}$ respectively.

3c. Initial Intermediate-scale Gradient Functions

Given an initial large-scale gradient function $gm0_L(t)$ at a scale L and an initial small-scale gradient function $gm0_S(t)$ that applies to the smaller scales from 0 through S as defined above, then the initial gradient functions at the intermediate scales from S+1 through L−1 are generated according to the following preferred embodiment:

$$gm0_k(t) = gm0_S(t) \cdot \left(\frac{gm0_L(t)}{gm0_S(t)}\right)^{\frac{k-S}{L-S}}, \quad k = S+1, S+2, \ldots, L-1$$

This specification of the intermediate scale gradient functions ensures a gradual transition from the large-scale gradient function to the small-scale gradient function. As a consequence, the contrast behaviour evolves gradually from the large-scale contrast behaviour specified by $gm0_L(t)$, to the contrast behaviour specified by $gm0_S(t)$.

Figure 9:
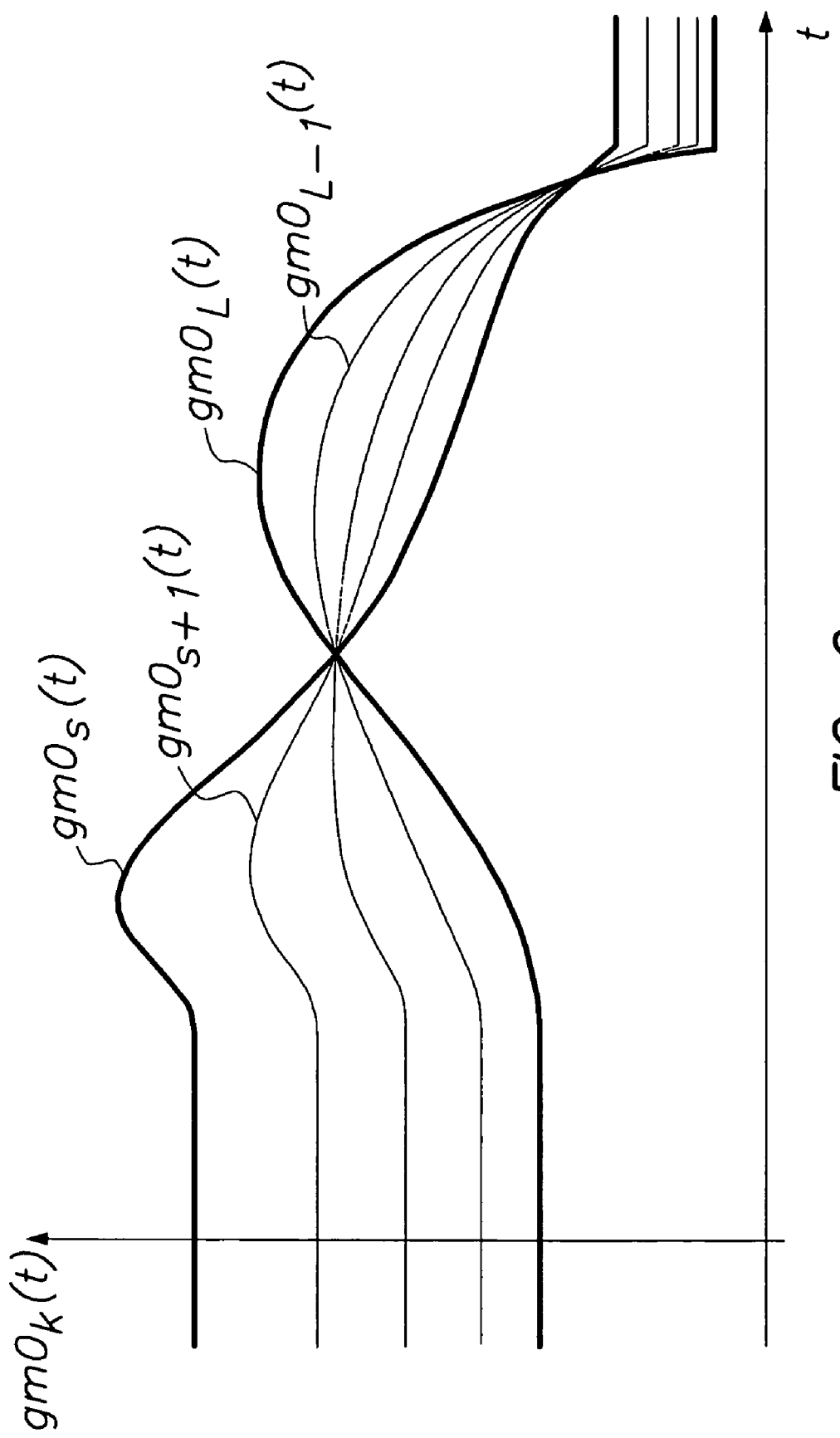
FIG. 9 shows the initial scale-specific gradients at large, intermediate and small scales, as a function of grey value.

In a preferred embodiment, the small-scale parameter S is preferably set within the range [0, 4], and L should preferably be in the range [S+2, $k_{max}$–1], where $k_{max}$ is the largest scale of the multiscale decomposition. In case the image dimensions are 2048×2048, most preferable settings are S=3 and L=7. In that case, the scales 0, 1, 2 and 3 are controlled by the same small-scale gradient function $gm0_S(t)$, the large-scale gradient function applies to scale 7, and a gradual transition is provided from scale 4 through scale 6. An example of a series of these functions is illustrated in FIG. 9.

A few alternative embodiments of methods for defining the initial gradient functions $gm0_k(\ )$ are described in EP 02102368 filed Sep. 18, 2002.

4. Interactive Adjustment of Density and Contrast

An image processed according to the above described multiscale gradation method and displayed on a display monitor will have appropriate density and contrast if the initial multiscale gradient functions $gm0_k(\ )$ are defined properly.

However, the initial specification of these functions may not be optimal, or the viewing task at hand may impose special requirements on density or contrast in some density band, e.g. the density band that corresponds to the lung fields may need more contrast and lower density.

It is possible to independently adjust the density level and the contrast of all image regions belonging to the specified density band by an interactive procedure in accordance with the findings of the present invention.

In an interactive adjustment session, the initial state and the corresponding displayed image is determined by the series of initial multiscale gradient functions $gm0_k(\ )$ specified by one of the methods described above. With each adjustment induced by a user interaction an updated series of multiscale gradient functions $gm_k(\ )$ is generated by applying changes to the initial series. Upon every change the above method of multiscale gradation is applied to the updated multiscale gradient functions and preferably the resulting image is displayed to provide the user with feedback about the adjustment. This way, any desired modification of density or contrast in parts of the image can be efficiently accomplished by one or more user-induced adjustments, thereby significantly improving the workflow, also in difficult cases that require critical adjustments.

In a preferred embodiment the density band that requires adjustment is specified by indicating a point in the initially displayed image that has the intended density. This can be done using any device means denoted by indicium intended for indicating positions in an image, such as a cursor operated by a computer mouse. The density of the indicated point is denoted by the initial density yr0. The amounts of density and contrast adjustment denoted by dy and dc are indicated by the movement of a cursor in a window, or by any two-dimensional pointing device or interactive controller. Preferably, the window in which the cursor can be moved is the image window, so that the viewer doesn't have to remove focus from the image during adjustment. Alternatively, two separate one-dimensional GUI controls can be used to specify the amounts of adjustment dy and dc, such as two sliders or scroll bars.

The adjustment parameters specify the amount of density and contrast amplification adjustment to be applied to all pixels that have a density that is substantially equal to the initial density yr0. The adjustment quantities are specified relative to the settings that yield the initially displayed image. Subsequent adjustment parameters may be specified still to the initially displayed image, or relative to the result of the previous adjustment, i.e. subsequent adjustments may be absolute or incremental. The starting position of the cursor used for specifying the adjustment parameters is preferably in the center of the image. Alternatively, it may be a point in a notional coordinate system within the cursor window comprising a density axis in horizontal direction and a contrast amplification axis in vertical direction, where the initial cursor position relative to the coordinate system is indicative of the initial density and contrast amplification of the selected density band.

In a preferred embodiment the adjustment of density and contrast amplification is carried out as described below.

First, the initial small-scale gradient function $gm0_S(t)$ is expressed in terms of density y instead of grey value t, using the relationship $t0_L(y)$, which is the inverse of the large-scale gradation function $y0_L(t)$.

Figure 10:
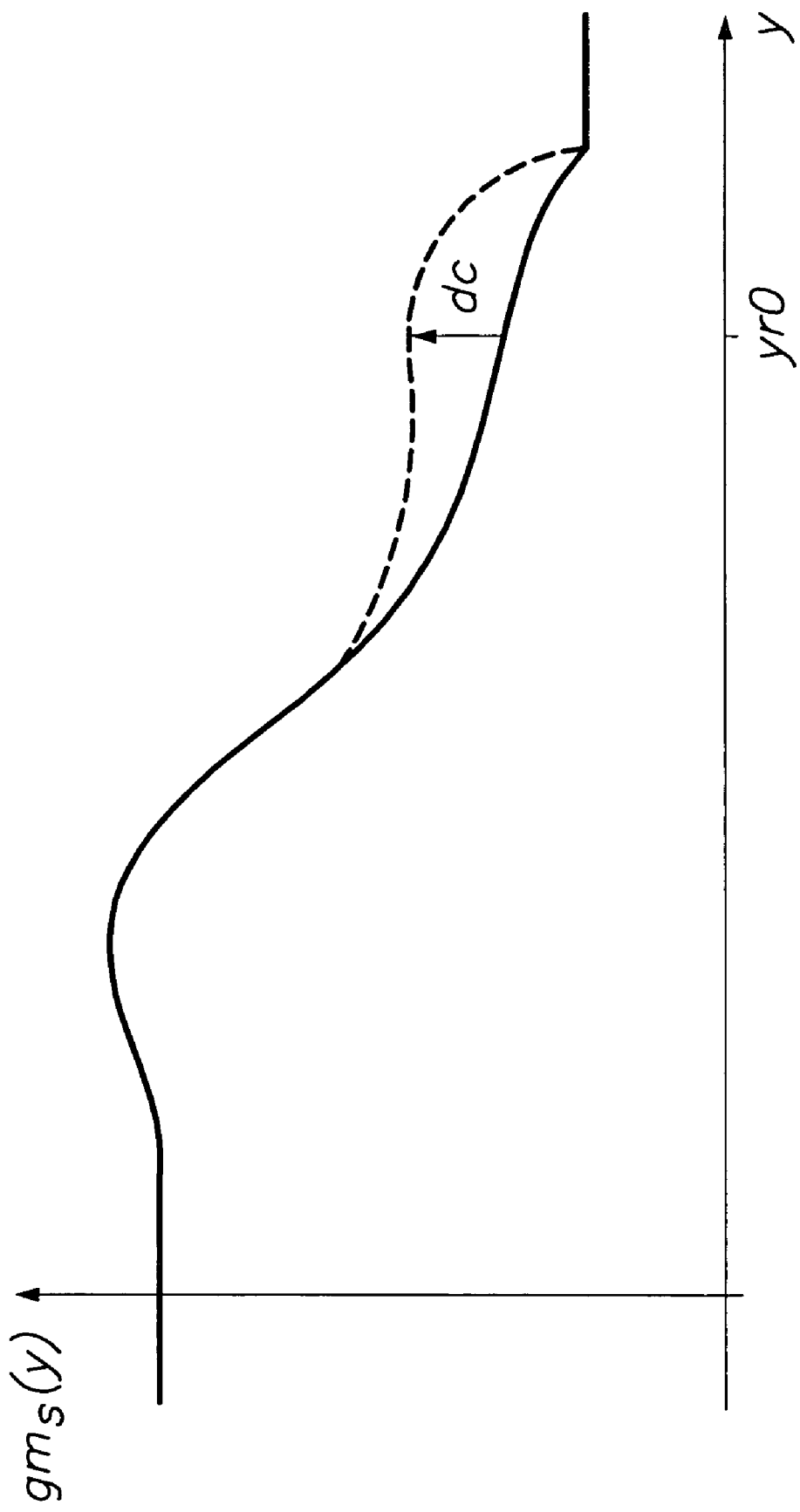
FIG. 10 illustrates the interactive adjustment of contrast of pixels in a specified density band.

Next, the small-scale gradient function is locally deformed in ordinate direction by an amount dc across a subrange centered at the initial density yr0, as depicted in FIG. 10. This can be done by representing the small-scale gradient function by a Bezier curve or a spline and using common graphical techniques to accomplish a smooth local deformation. This ensures that the magnitude of deformation is highest at the initial density yr0, and gradually diminishes to zero at the boundaries of the subrange. The wider the subrange that specifies the density band, the more pixels of the image will be involved in the adjustment procedure. Preferably, the subrange width is 25% of the overall density range.

The deformed small-scale gradient function is subsequently expressed in terms of grey values t, using the initial large-scale gradation $y(t)=y0_L(t)$ as conversion function, yielding an adjusted small-scale gradient function $gm_S(t)$.

Figure 11:
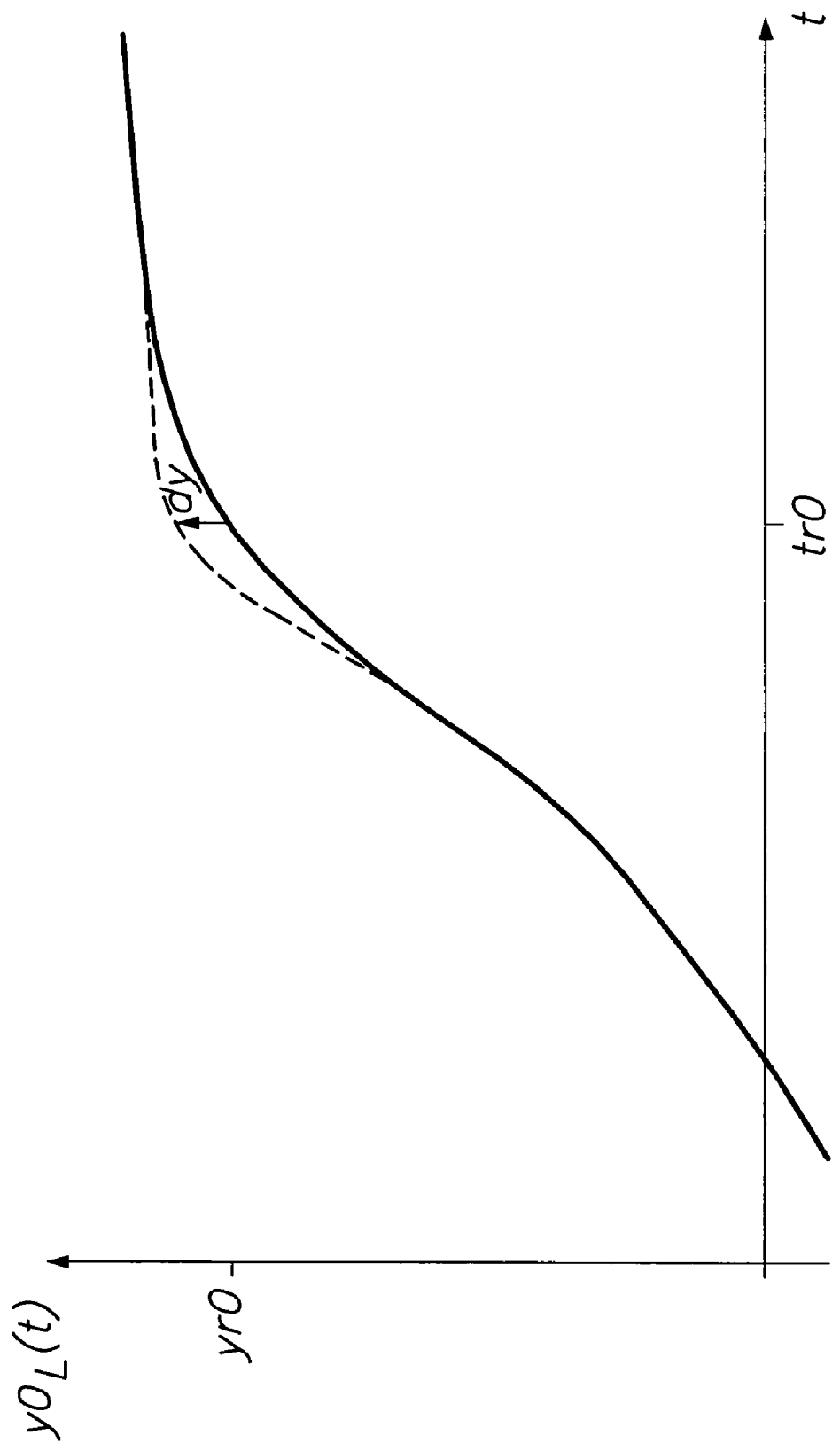
FIG. 11 illustrates the interactive adjustment of density of pixels in a specified density band.

Next, the density adjustment is applied by locally deforming the large-scale gradation function $y(t)=y0_L(t)$ in ordinate direction by an amount dy across a subrange centered at the grey value tr0 that corresponds with density yr0, i.e. the t-value for which $y0_L(tr0)=yr0$, as depicted in FIG. 11. This is done in a similar way as the local adjustment of the small-scale gradient function described above.

The thus adjusted large-scale gradation function is denoted by $y_L(t)$. The derivative of this function yields the adjusted large-scale gradient function $gm_L(t)$.

A series of adjusted intermediate-scale gradient functions is obtained in a similar way as the initial gradient functions, based on the adjusted versions of the small-scale and large-scale gradient functions:

$$gm_k(t) = gm_S(t) \cdot \left(\frac{gm_L(t)}{gm_S(t)}\right)^{\frac{k-S}{L-S}}, \quad k = S+1, S+2, \ldots, L-1$$

If finally the reconstruction procedure of multiscale gradation is applied as described higher under the heading 'Reconstruction and multiscale gradation', using the adjusted gradient functions $gm_k$ instead of the initial set of functions $gm0_k$, then an image with independently adjusted density and contrast results, in accordance with the findings of the present invention.

The multiscale gradient functions and the large-scale gradation function are preferably specified by means of piecewise polynomials. This representation is advantageous for computing a smooth local deformation, or for computing the derivative function. Alternatively, the large-scale gradation function may be specified in the form of a table of coordinate pairs, which is an appropriate representation for computing the inverse relation $t0_L(y)$, thereby avoiding explicit function inversion. Both the forward and inverse functions are evaluated at arbitrary points by linear interpolation of the table values. The kind of representation is not essential and is merely motivated by the mathematical simplicity of the operations that must be applied. Transition from one kind of representation to the other is done by common interpolation techniques.

When applying density adjustment to the large-scale gradation it is important to ensure that the resulting function remains monotonic. It is also preferable to impose limits to the slope of the gradation function, and to the ordinates of the small-scale gradient function in order to avoid excessive contrast amplification.

Figure 12:
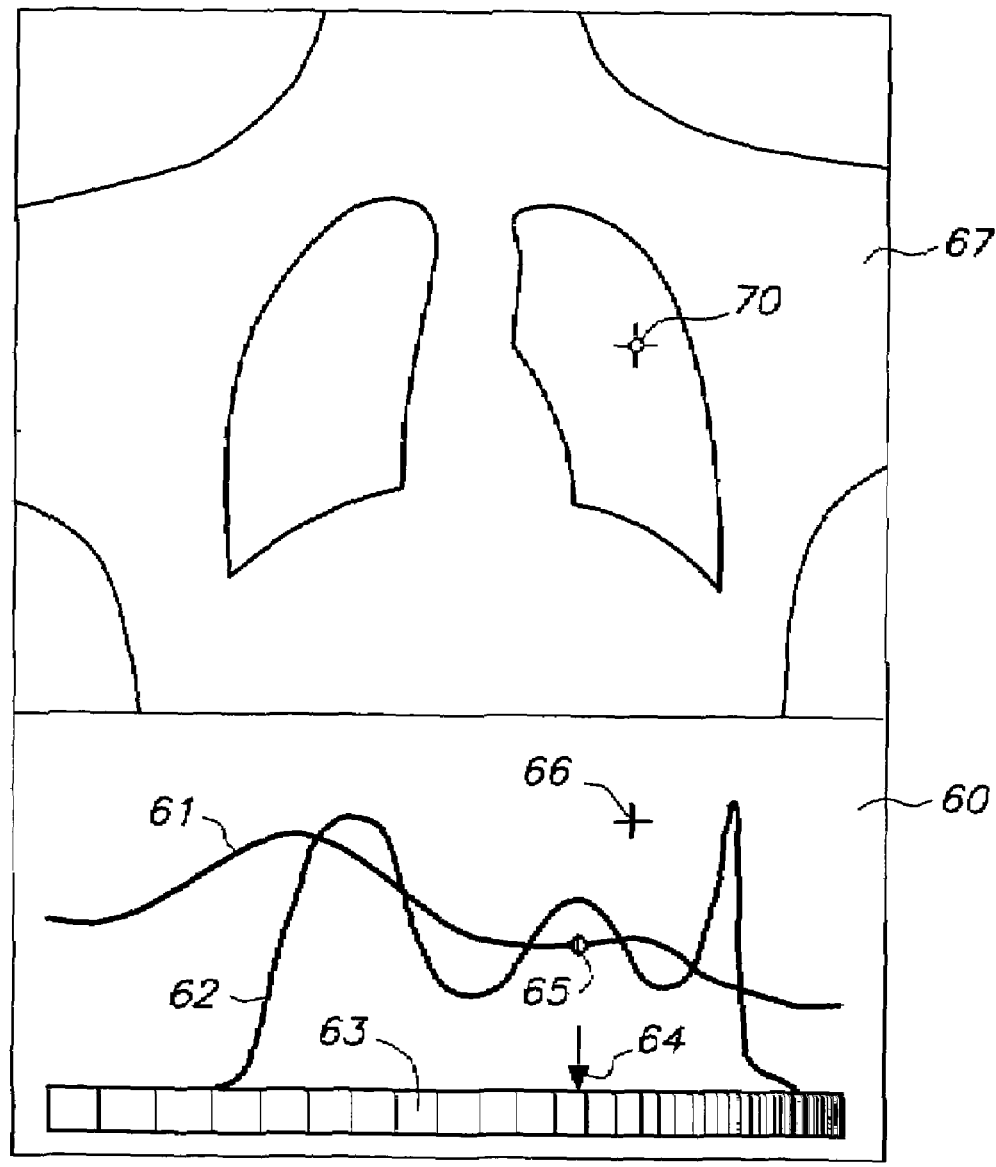
FIG. 12 illustrates a display window and interactive controls for the adjustment of density and contrast of pixels in a specified density band, according to a second and third embodiment.

In a second embodiment of independent adjustment of density and contrast of pixels belonging to a specified density band, referring to FIG. 12, a two-dimensional graph (60) is displayed that plots small-scale gradient representing contrast as a function of density. At the beginning of an adjustment session, the initial gradient function $gm0_S(y)$ (61) is plotted, along with the histogram (62) as a function of density. In addition, a density wedge (63) may be plotted along the density axis to explicitly display the corresponding density at each abscissa value.

The nominal density of the density band intended to be adjusted is indicated by the user by placing a cursor (64) or other pointing means at the desired position along the density axis. Upon acknowledgement of the thus selected density band, the corresponding point $[yr0, gm0_S(yr0)]$ on the contrast function plot is marked as the starting position (65) for subsequent adjustment. The desired adjustment of density and contrast amplification are indicated by moving a cursor (66) or any other pointing means relative to the marked point, either in a vertical direction for specifying contrast adjustment dc, or in a horizontal direction for specifying density adjustment dy, or in any other direction for specifying a simultaneous adjustment in proportion to the horizontal and vertical movement components. Each time a set of adjustment parameters are specified, the series of adjusted gradient functions $gm_k()$ and resulting image are computed as described in the first embodiment. Real-time feedback to the user is achieved by updating the displayed image (67) on each cursor movement. In addition the contrast function plot and the histogram may be updated for improved feedback.

In a third embodiment, referring to FIG. 12, a two-dimensional graph is displayed that plots small-scale gradient representing contrast as a function of density along with the histogram and a density wedge along the density axis, as described in the previous embodiment.

However, the nominal density of the density band intended to be adjusted is indicated by the user by indicating a point (70) in the displayed image having the same density, as described in the first embodiment. Similarly, the amounts of density and contrast adjustment dy and dc are indicated by the movement of a cursor in the window. The selected nominal density of the density band to be adjusted is marked on the contrast function plot as the starting position for subsequent adjustment. Upon movement of the cursor that indicates the desired amount of adjustment, the image, the histogram and the contrast function are updated, along with the initial marker and the cursor that indicates the current adjustment.

The invention claimed is:

1. A method of modifying at least one of contrast and density of pixels of a processed image comprising the steps of:
   (a) displaying said processed image on a display screen,
   (b) specifying an initial density level in said processed image by covering a pixel or pixel region by means of a first indicium which is capable of responding to a user input for moving said indicium relative to the displayed processed image, the density of the pixel or pixel region covered by said indicium being the initial density,
   (c) in response to a user input, moving a second indicium in at least one of two directions relative to the displayed processed image,
   (d) changing the contrast of pixels in the displayed processed image which have substantially the same density as said initial density upon receiving the user input for movement of said second indicium in a first of said directions, and
   (e) changing the density of pixels in the displayed processed image which have substantially the same density as said initial density upon receiving the user input for movement of said second indicium in a second of said directions,
   wherein contrast and density are changed independently by modifying a multi-scale representation of said image, wherein the modification is derived from at least two gradient functions determined at different scales, and wherein a gradient function at a specific scale specifies how contrast amplification at a scale depends on density.

2. The method according to claim 1 wherein the amount by which the contrast of selected pixels is changed is largest for pixels having a density equal to said initial density.

3. The method according to claim 2, wherein the amount by which the density of selected pixels is changed is largest for pixels having a density equal to said initial density.

4. The method according to claim 3, wherein said amount of density change gradually decreases for pixels that have either lower or higher density values relative to the initial density level.

5. The method according to claim 1, wherein the amount by which the density of selected pixels is changed is largest for pixels having a density equal to said initial density.

6. The method according to claim 5 wherein said amount of density change gradually decreases for pixels that have either lower or higher density values relative to the initial density level.

7. A computer readable medium encoded with a computer executable program code which executes the steps of:
   (a) displaying a processed image on a display screen,
   (b) specifying an initial density level in said processed image by covering a pixel or pixel region by means of a first indicium which is capable of responding to a user input for moving said indicium relative to the displayed processed image, the density of the pixel or pixel region covered by said indicium being the initial density, (c) in response to a user input, moving a second indicium in at least one of two directions relative to the displayed processed image, (d) changing the contrast of pixels in the displayed processed image which have substantially the same density as said initial density upon receiving the user input for movement of said second indicium in a first of said directions, and (e) changing the density of pixels in the displayed processed image which have substantially the same density as said initial density upon receiving the user input for movement of said second indicium in a second of said directions, wherein contrast and density are changed independently by modifying a multi-scale representation of said image, wherein the modification is derived from at least two gradient functions determined at different scales, and wherein a gradient function at a specific scale specifies how contrast amplification at a scale depends on density.

8. The computer readable medium encoded with a computer executable program code according to claim 7, wherein the amount by which the contrast of selected pixels is changed is largest for pixels having a density equal to said initial density.

9. The computer readable medium encoded with a computer executable program code according to claim 8, wherein the amount by which the density of selected pixels is changed is largest for pixels having a density equal to said initial density.

10. The computer readable medium encoded with a computer executable program code according to claim 9, wherein said amount of density change gradually decreases for pixels that have either lower or higher density values relative to the initial density level.

11. The computer readable medium encoded with a computer executable program code according to claim 7, wherein the amount by which the density of selected pixels is changed is largest for pixels having a density equal to said initial density.

12. The computer readable medium encoded with a computer executable program code according to claim 11, wherein said amount of density change gradually decreases for pixels that have either lower or higher density values relative to the initial density level.

13. A user interface for an image processing and display unit comprising:

(a) a window wherein a processed image is displayed, (b) a first indicium capable of responding to user input for moving relative to the displayed processed image, wherein the density of a pixel or pixel region covered by movement of said first indicium is an initial density, and (c) a second indicium capable of responding to user input for moving in at least one of two directions relative to the displayed processed image, wherein said user input for movement of said second indicium in a first direction causes a change of density of pixels in the displayed processed image that have a density value that is substantially equal to said initial density, wherein said user input for movement of said second indicium in a second direction causes a change of contrast of pixels in the displayed processed image that have a density value that is substantially equal to said initial density, and wherein contrast and density are changed independently by modifying a multi-scale representation of said image, wherein the modification is derived from at least two gradient functions determined at different scales, and wherein a gradient function at a specific scale specifies how contrast amplification at a scale depends on density.

14. The user interface for an image processing and display unit according to claim 13, wherein the amount by which the contrast of selected pixels is changed is largest for pixels having a density equal to said initial density.

15. The user interface for an image processing and display unit according to claim 14, wherein the amount by which the density of selected pixels is changed is largest for pixels having a density equal to said initial density.

16. The user interface for an image processing and display unit according to claim 15, wherein said amount of density change gradually decreases for pixels that have either lower or higher density values relative to the initial density level.

17. The user interface for an image processing and display unit according to claim 13, wherein the amount by which the density of selected pixels is changed is largest for pixels having a density equal to said initial density.

18. The user interface for an image processing and display unit according to claim 17, wherein said amount of density change gradually decreases for pixels that have either lower or higher density values relative to the initial density level.

* * * * *